(12) United States Patent
Kuwamura (10) Patent No.: US 7,301,141 B2
(45) Date of Patent: Nov. 27, 2007

(54) PHOTOELECTRIC ENCODER AND ELECTRIC DEVICE PROVIDED WITH THE SAME

(75) Inventor: Yasukazu Kuwamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/484,760

(22) Filed: Jul. 12, 2006

(65) Prior Publication Data

US 2007/0018085 A1    Jan. 25, 2007

(30) Foreign Application Priority Data

Jul. 25, 2005    (JP) .............................. 2005-214621

(51) Int. Cl.
  *G01D 5/34* (2006.01)
(52) U.S. Cl. .............................. 250/231.13; 250/231.14
(58) Field of Classification Search ........... 250/231.13, 250/231.14, 231.15, 231.16, 237 G
  See application file for complete search history.

(56) References Cited

U.S. PATENT DOCUMENTS 4,716,292 A * 12/1987 Rieder et al. ............ 250/237 G
5,177,357 A * 1/1993 Yamaguchi et al. ... 250/231.16
6,995,356 B2 * 2/2006 Chong et al. ............ 250/231.14
2005/0077457 A1 * 4/2005 Hofer ..................... 250/231.13

FOREIGN PATENT DOCUMENTS

| JP | 50-159759 | 12/1975 |
| JP | 59-122506 U | 8/1984 |
| JP | 64-44413 U | 3/1989 |
| JP | 4-238223 A | 8/1992 |
| JP | 10-235958 A | 9/1998 |
| JP | 2004-506884 A | 3/2004 |
| JP | 2004-160871 A | 6/2004 |
| WO | 02/14794 A1 | 2/2002 |

* cited by examiner

*Primary Examiner*—John R. Lee
(74) *Attorney, Agent, or Firm*—Nixon & Vanderhye, P.C.

(57) ABSTRACT

A photoelectric encoder of the invention is furnished with a light-emitting element and a light-receiving element for sending and receiving light that are disposed in opposition to one another, and a support member for accommodating the light-emitting element and the light-receiving element. The support member is provided with a through hole between the light-emitting element and the light-receiving element. A code strip in which a plurality of slits have been formed is inserted through the through hole and moved so that it passes between the light-emitting element and the light-receiving element. As a result, light from the light-emitting element is intermittently incident on the light-receiving element through the plurality of slits in the code strip.

19 Claims, 7 Drawing Sheets

PHOTOELECTRIC ENCODER AND ELECTRIC DEVICE PROVIDED WITH THE SAME

TECHNICAL BACKGROUND

This application claims priority under U.S.C. §119(a) on Patent Application 2005-214621 filed in Japan on Jul. 25, 2005, the entire contents of which are herein incorporated by reference.

The present invention relates to photoelectric encoders for detecting code strips, and electric devices provided with such photoelectric encoders.

Conventionally, for example as disclosed in JP 2004-506884A, there has been technology in which a code wheel is inserted between a light-emitting element and a light-receiving element that are in opposition and is rotated, and this code wheel is detected. Here, although particular attention is placed on the lens shape and the lens material etc. of the light-emitting element, the structure is such that the code wheel easily comes into contact with the light-emitting element, the light-receiving element and the lens, and no special measures are taken to avoid this contact. Thus, the light-emitting element, the light-receiving element and the lens etc. become soiled, and this lowers the precision with which the code wheel is detected.

JP H10-235958A discloses a magnetic encoder that detects the magnetic state of a scale portion that is magnetized. In this case, although the detection precision does not drop if the scale portion or the detection portion, for example, becomes soiled, the magnetic encoder has a complex structure and this increases costs.

Further, JP 2004-160871A discloses an optical encoder that optically reads a scale. Here, cleaning members are provided on either side of the scale, and when soiling has been detected by a soils detection sensor, the encoder sensor is moved to and cleaned by the cleaning members. However, the structure is complicated by the fact that it is necessary to provide a soils detection sensor and cleaning members, for example. When the cleaning ability of the cleaning members worsens, there is a drop in the precision with which the scale is detected. Additionally, like in JP 2004-506884A, the structure is such that the scale easily comes into contact with the light-emitting element, the light-receiving element or the lens, for example, and no particular steps have been taken to avoid this contact.

In this way, the structure of conventional optical encoders is such that the code wheel or the scale etc. easily comes into contact with the light-emitting element and the light-receiving element and the lens, for example, and no specific steps are taken to avoid this contact, and thus the light-emitting element, the light-receiving element and the lens, for example, will become soiled and this lowers the precision with which the code wheel or the scale etc. is detected.

The photoelectric encoders generally used in printers, for example, are provided with a recessed groove between the light-emitting element and the light-receiving element, and a code strip (this corresponds to a code wheel or scale) is passed through this groove. In one example, the width of the recessed groove is set to about 0.5 mm and a 0.19-mm thick code strip is passed there through. Therefore, it could be said that there is a clearance of 0.31 mm around the code strip. Thus, there was a wide gap around the code strip from which ink, for example, could enter the recessed groove and soil the light-emitting element and the light-receiving element.

SUMMARY

The present invention was arrived at in light of the foregoing conventional problems, and it is an object thereof to provide a photoelectric encoder whose structure makes it difficult for the light-emitting element and the light-receiving element to become soiled, and an electric device that is provided with this photoelectric encoder.

To solve the foregoing problems, an optical encoder of the invention is furnished with a light-emitting element and a light-receiving element for sending and receiving light that are disposed in opposition to one another, and a support member for accommodating the light-emitting element and the light-receiving element, and a code strip that is furnished with a plurality of slits is passed between the light-emitting element and the light-receiving element. In this photoelectric encoder, the support member is provided with a through hole or a through groove having a rectangular cross-sectional shape into which the code strip is inserted and which guide the code strip, and the through hole or the through groove guide the code strip in such a manner that the code strip does not come into contact with other members aside from the through hole or the through groove in the support member.

With this optical encoder, members other than the through hole or the through groove are disposed at positions that are removed from the region through which the code strip passes so that the through hole or the through groove of the support member guide the code strip in such a manner that the code strip does not come into contact with members aside from the through hole or the through groove, and thus members other than the through hole or the through groove, such as the light-emitting element, the light-receiving element, or the lens do not come into contact with the code strip and become soiled.

In a further aspect, the support member is provided with a frame member that surrounds the light-emitting side of the light-emitting element or the light-receiving side of the light-receiving element, and that faces the through hole or the through groove. This frame member can block soils such as ink that have splattered from the code strip and thus the light-emitting element or the light-receiving element can be kept from becoming soiled.

It is preferable that the frame member is made from a flexible material. Thus, soils such as ink adhered to the code strip can be wiped away without damaging the code strip when the code strip comes into contact with the frame member.

In a further aspect, an open window through which light passes is formed in the support member on the light-emitting side of the light-emitting element or the light-receiving side of the light-receiving element. In other words, the area of the opening of the light-emitting side of the light-emitting element or the light-receiving side of the light-receiving element is restricted. In this regard as well, soils such as ink that have splattered from the code strip can be kept from reaching the light-emitting element or the light-receiving element, and thus the light-emitting element or the light-receiving element can be prevented from becoming soiled.

In a further aspect, a space is provided between the light-emitting side of the light-emitting element and the through hole or the through groove in the support member. Thus, soils such as ink that have splattered from the code strip toward the light-emitting element can fall down into that space, allowing the light-emitting element to be kept from being soiled by soils such as ink.

In a further aspect, a fitting recession is formed in an inner circumferential wall of the support member and a fitting projection is formed in the light-emitting member, and the light-emitting element is positioned by fitting the fitting projection of the light-emitting element into the fitting recession of the internal circumferential wall.

In a further aspect, the support member is furnished with a discharge hole that is connected to the through hole or the through groove and that extends downward from the through hole or the through groove. Thus, soils such as ink that have splattered from the code strip can be discharged through this discharge hole.

In a yet further aspect, the discharge hole is connected to a duct hole that extends in the horizontal direction below the discharge hole. In this case, soils such as ink that have fallen through the discharge hole is either discharged to the outside through the duct hole or collected in the duct hole.

An electric device is furnished with a photoelectric encoder of the invention. This electric device therefore can obtain the above effects obtained by the photoelectric encoders of the invention.

DESCRIPTION OF THE EXEMPLARY EMBODIMENTS

Hereinafter, exemplary embodiments of the invention are described in detail with reference to the appended drawings.

First Exemplary Embodiment

Figure 1:
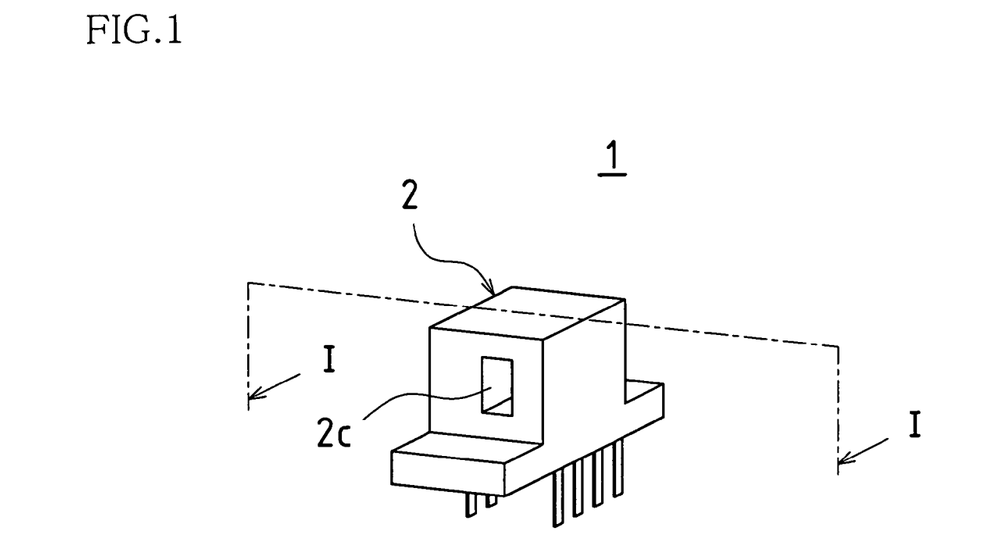
FIG. 1 is a perspective view showing a first exemplary embodiment of the photoelectric encoder.
Figure 2:
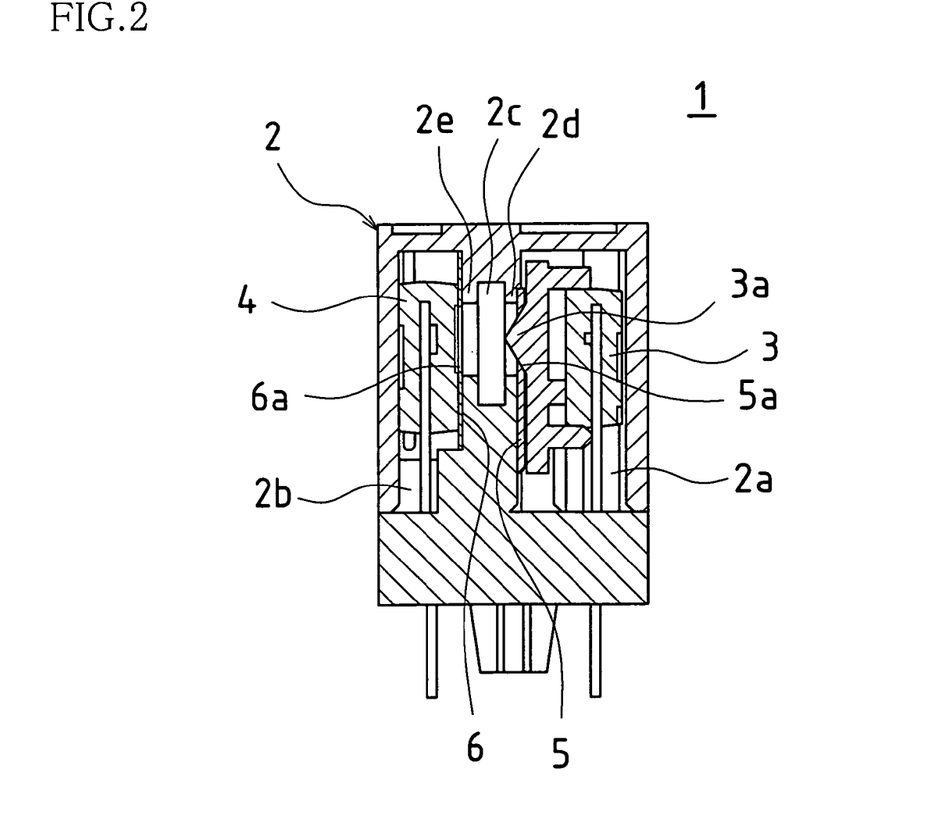
FIG. 2 is a cross section taken along the line I-I in FIG. 1.
Figure 3:
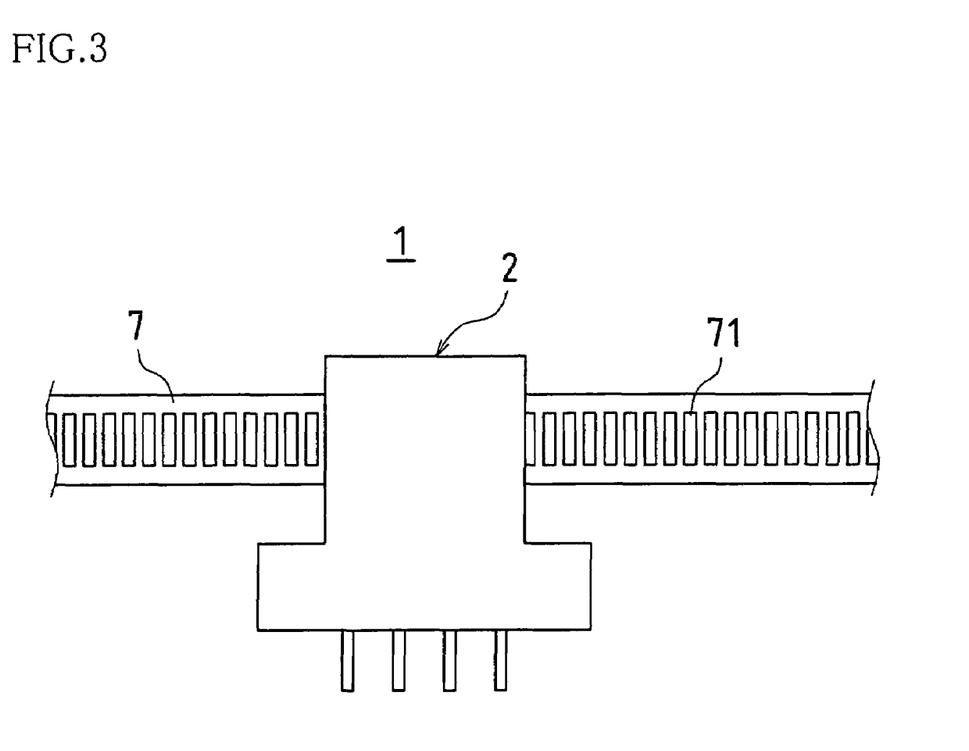
FIG. 3 is a front view showing the photoelectric encoder when a code strip has been inserted through the through hole.

FIG. 1 is a perspective view showing a first embodiment of a photoelectric encoder. FIG. 2 is a cross section taken along the line I-I in FIG. 1. FIG. 3 is a front view showing an example in which a code strip has been inserted through a through hole of the photoelectric encoder.

In a photoelectric encoder 1 of this exemplary embodiment, two support chambers 2a and 2b are formed on an inner side of a support member 2, and a light-emitting element 3 and a light-receiving element 4 are disposed in these support chambers 2a and 2b. The light-emitting element 3 and the light-receiving element 4 are disposed in opposition to one another, and are for sending and receiving light. A rectangular through hole 2c is formed in the support member 2 and passes between the light-emitting element 3 and the light-receiving element 4. A wall 2d between the support chamber 2a and the through hole 2c is open, and a light-emitting side open window 5a of a slit member 5 overlaps with this open portion. Similarly, a wall 2e between the support chamber 2b and the through hole 2c is open, and a light-receiving side open window 6a of a slit member 6 overlaps with this open portion.

The light-emitting element 3 and the light-receiving element 4 are in opposition to each other, sandwiching between them the light-emitting side open window 5a, the through hole 2c, and the light-receiving side open window 6a. The light-emitting element 3 has a lens 3a, and the lens 3a is positioned fitted into the light-emitting side open window 5a. Thus, the light of the light-emitting element 3 is incident on light-receiving element 4 after passing through the lens 3a of the light-emitting side open window 5a, the through hole 2c, and the light-receiving side open window 6a. The size of the light-emitting side open window 5a and the light-receiving side open window 6a is optically determined from the distance separating the light-emitting element 3 and the light-receiving element 4 and the positional relationship between the light-emitting element 3 and the lens 3a.

In the photoelectric encoder 1 having this configuration, when a code strip 7 is inserted into and moved through the through hole 2c of the support member 2, the light of the light-emitting element 3 passes through a plurality of slits 71 formed in the code strip 7 and is intermittently incident on the light-receiving element 4. Based on the received-light output of the light-receiving element 4 at this time, it is possible to obtain the movement position, for example, of the code strip 7.

Here, when the height and the thickness of the cross-sectional shape of the code strip 7 are 6.0 mm and 0.19 mm, respectively, then the height and the width of the through hole 2c are set to 6.1 mm and 0.20 mm, respectively. As a result, a very narrow clearance of 0.1 mm between the code strip 7 and the through hole 2c can be formed. Thus, the code strip 7 substantially does not wobble in the through hole 2c and it is possible to smoothly move the code strip 7 through the through hole 2c.

Members such as the light-emitting element 3, the lens 3a, and the light-receiving element 4 do not protrude into the through hole 2c. In other words, members such as the light-emitting element 3, the lens 3a, and the light-receiving element 4 are disposed away from the region through which the code strip 7 passes. Thus, the code strip 7 does not touch members such as the light-emitting element 3, the lens 3a, and the light-receiving element 4 when within the through hole 2c, allowing it to smoothly move through the through hole 2c.

In this way, the code strip 7 moves smoothly because there is substantially no wobbling of the code strip 7 within the through hole 2c and the code strip 7 does not come into contact with members such as the light-emitting element 3, the lens 3a, and the light-receiving element 4, and thus even if the code strip 7 has become soiled, the soils can be kept from adhering to these members.

Also, the light-emitting side open window 5a of the light-emitting element 3 and the light-receiving side open window 6a of the light-receiving element 4 have the function of focusing light, as well as function to keep soils on the code strip 7 from reaching the light-emitting element 3 and the light-receiving element 4 so as to prevent the soils from adhering to these members.

In general, when a photoelectric encoder is employed in a printer, a copier, or in factory automation, one can assume that the code strip 7 will become soiled due to ink or oil, and it is often the case that ink or oil that has adhered to the code strip 7 will adhere to members such as the light-emitting element or the light-receiving element and lower the detection precision of the photoelectric encoder.

With the photoelectric encoder 1 of this embodiment, however, ink or oil that has adhered to the code strip 7 does not stick to members such as the light-emitting element 3, the lens 3a, and the light-receiving element 4, and thus the detection precision can be maintained without dropping.

It should be noted that using a conductive resin as the material of the support member 2 increases the effect of preventing ink, for example, from adhering to the recording equipment.

Second Exemplary Embodiment

Figure 4:
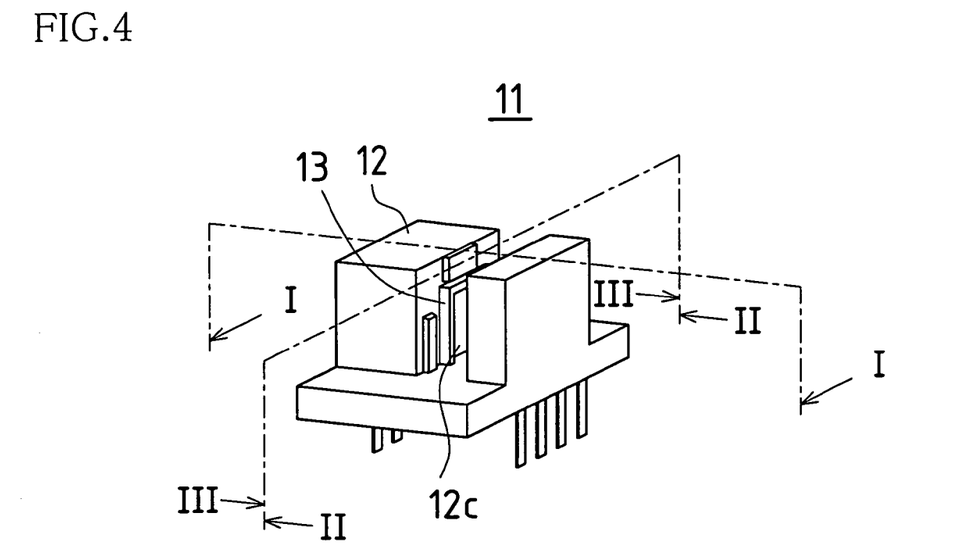
FIG. 4 is a perspective view showing a second exemplary embodiment of the photoelectric encoder
Figure 5:
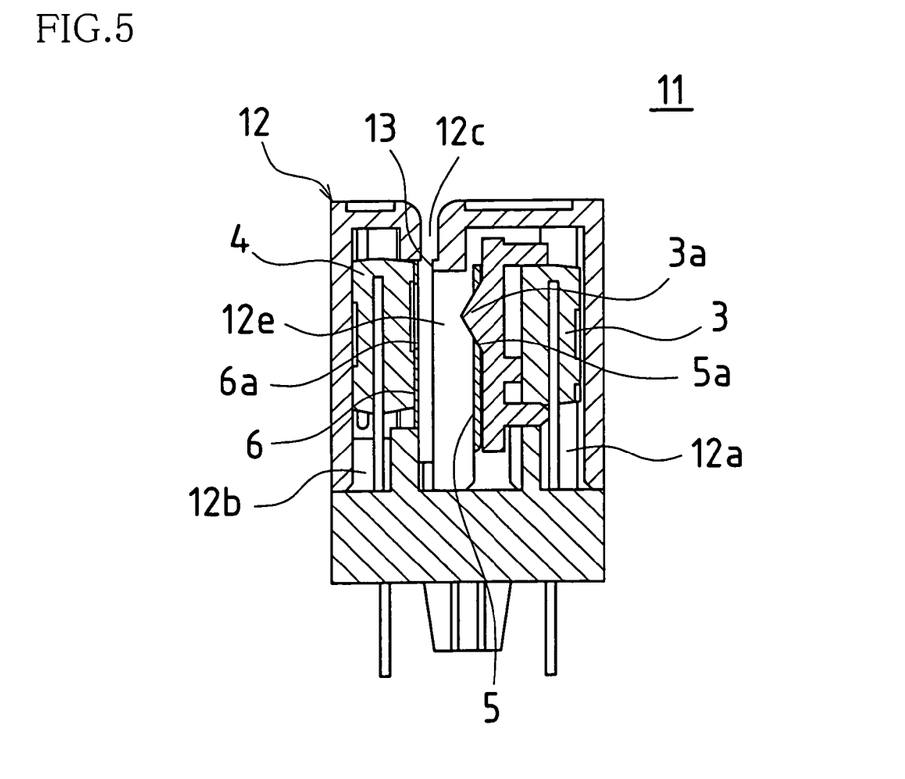
FIG. 5 is a cross section taken along the line I-I in FIG. 4.
Figure 6:
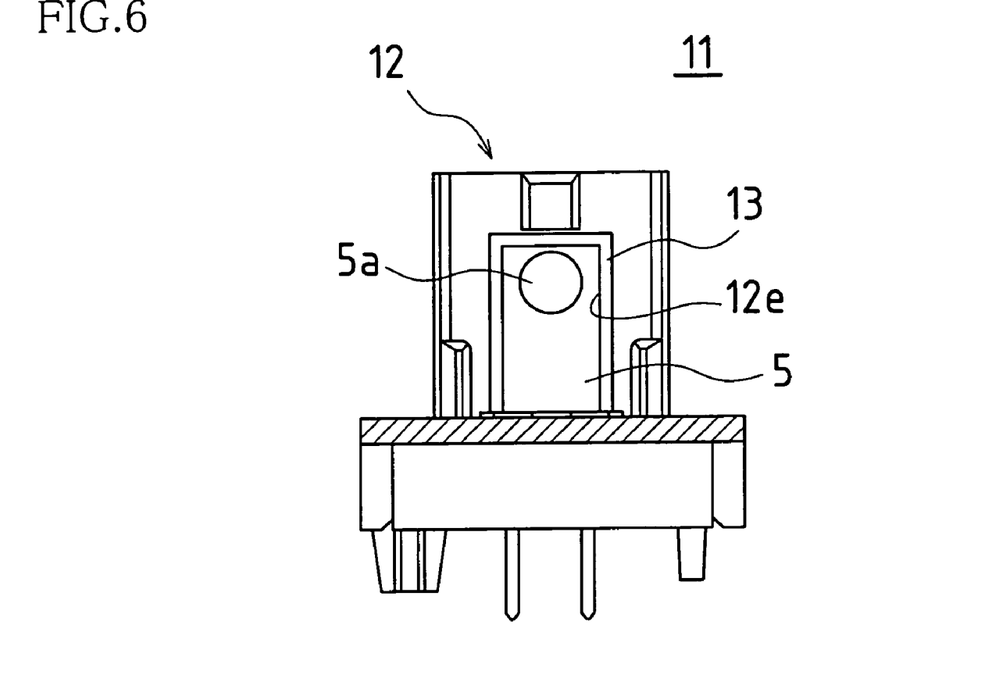
FIG. 6 is a cross section taken along the line II-II in FIG. 4.
Figure 7:
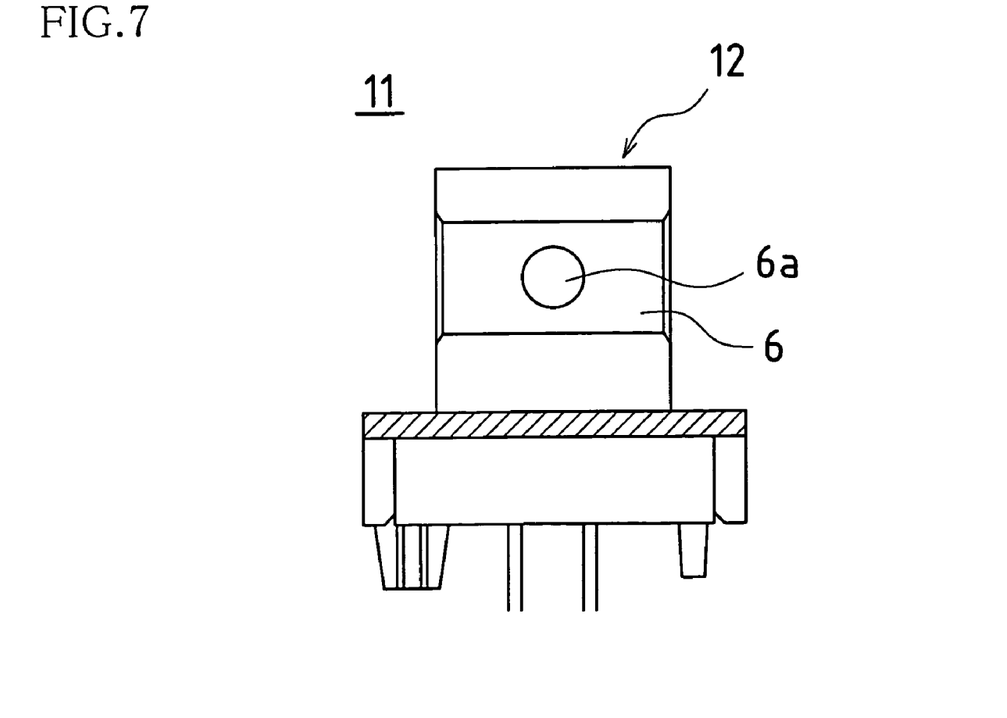
FIG. 7 is a cross section taken along the line III-III in FIG. 4.

FIG. 4 is a perspective view showing a second embodiment of the photoelectric encoder of the invention. FIG. 5 is a cross section taken along the line I-I in FIG. 4. FIG. 6 is a cross section taken along the line II-II in FIG. 4, and FIG. 7 is a cross section taken along the line III-III in FIG. 4.

It should be noted that in the following description and in FIGS. 4 to 7, structural components that carry out the same function as those of the first exemplary embodiment have been assigned the same reference numerals as in FIGS. 1 to 3 in order to avoid repeating a detailed description thereof.

In a photoelectric encoder 11 of this exemplary embodiment, two support chambers 12a and 12b are formed on inner sides of a support member 12, and the light-emitting element 3 and the light-receiving element 4 are disposed in these support chambers 12a and 12b. A through groove 2c that opens upward in the drawings is formed in the support member 12, passing between the light-emitting element 3 and the light-receiving element 4, which are in opposition to one another. A slit member 5 is disposed between the support chamber 12a and the through groove 12c, and a slit member 6 is disposed between the support chamber 12b and the through groove 12c. The light-emitting element 3 and the light-receiving element 4 are in opposition to one another, sandwiching between them the light-emitting side open window 5a of the slit member 5, the through groove 12c, and the light-receiving side open window 6a of the slit member 6. The light-emitting element 3 has a lens 3a, and the lens 3a is positioned fitted into the light-emitting side open window 5a.

In the support member 12, an opening 12e is formed between the support chamber 12a and the through groove 12c, and a frame member 13 is provided in such a manner that it surrounds the opening 12e and projects toward the through groove 12c.

In the photoelectric encoder 11 having this configuration as well, when a code strip 7 (see FIG. 3) is inserted into and moved through the through groove 12c of the support member 12, the light of the light-emitting element 3 is intermittently incident on the light-receiving element 4 through the plurality of slits 71 formed in the code strip 7, and it is possible to obtain the movement position, for example, of the code strip 7 based on the received-light output of the light-receiving element 4.

Here, when the height and the thickness of the cross-sectional shape of the code strip 7 are 6.0 mm and 0.19 mm, respectively, and the distance separating the light-emitting element 3 and the light-receiving element 4 is 0.5 mm, then the thickness of the frame member 13 is set to 0.3 mm. By doing this, the effective width of the through groove 12c is set to 0.2 mm (0.5 mm–0.3 mm), and thus a very narrow clearance of 0.1 mm between the code strip 7 and the through groove 12c can be formed. Accordingly, the code strip 7 can be moved within the through groove 12c without substantially wobbling.

Also, members such as the light-emitting element 3, the lens 3a, and the light-receiving element 4 do not protrude into the through groove 12c. In other words, members such as the light-emitting element 3, the lens 3a, and the light-receiving element 4 are disposed away from the region through which the code strip 7 passes. Thus, the code strip 7 can move smoothly within the through groove 12c without touching members such as the light-emitting element 3, the lens 3a, and the light-receiving element 4.

In this way, the code strip 7 moves smoothly because it hardly wobbles within the through groove 12c and it does not come into contact with members such as the light-emitting element 3, the lens 3a, and the light-receiving element 4 within the through groove 12c, and thus even if the code strip 7 becomes soiled, the soiling can be kept from adhering to these members.

Also, the light-emitting side open window 5a of the light-emitting element 3 and the light-receiving side open window 6a of the light-receiving element 4 function to keep soils on the code strip 7 from reaching the light-emitting element 3 and the light-receiving element 4, and thus can prevent soils from adhering to the light-emitting element 3 and the light-receiving element 4.

Additionally, the frame member 13 of the opening 12e of the support member 12 also has the function of keeping soils on the code strip 7 from reaching the light-emitting element 3. Thus, there is even greater protection against soils adhering to the light-emitting element 3.

As for the material of the frame member 13, as long as the material is flexible, a flexible rubber or silicone-based resin may be used. In such a case, even if the code strip 7 comes into contact with the frame member 13, the frame member 13 will not damage the code strip 7. Also, by coming into contact with the frame member 13, soils such as ink that have adhered to the code strip 7 can be wiped off.

If frame member 13 is made of a flexible rubber or silicone-based resin, then the thickness of the frame member 13 can be set to 0.31 mm so that the width of the through groove 12c is matched to the 0.19 mm thickness of the code strip 7, thereby setting the clearance between the through groove 12c and the code strip 7 to zero. In this case, the frame member 13 reliably contacts the code strip 7 so that the frame member 13 can effectively remove soils such as ink that have adhered to the code strip 7.

It should be noted that the frame member facing the through groove 12c can be provided, as above, in the support member 12 on the side with the support chamber 12b, in which the light-receiving element 4 is disposed.

Third Exemplary Embodiment

Figure 8:
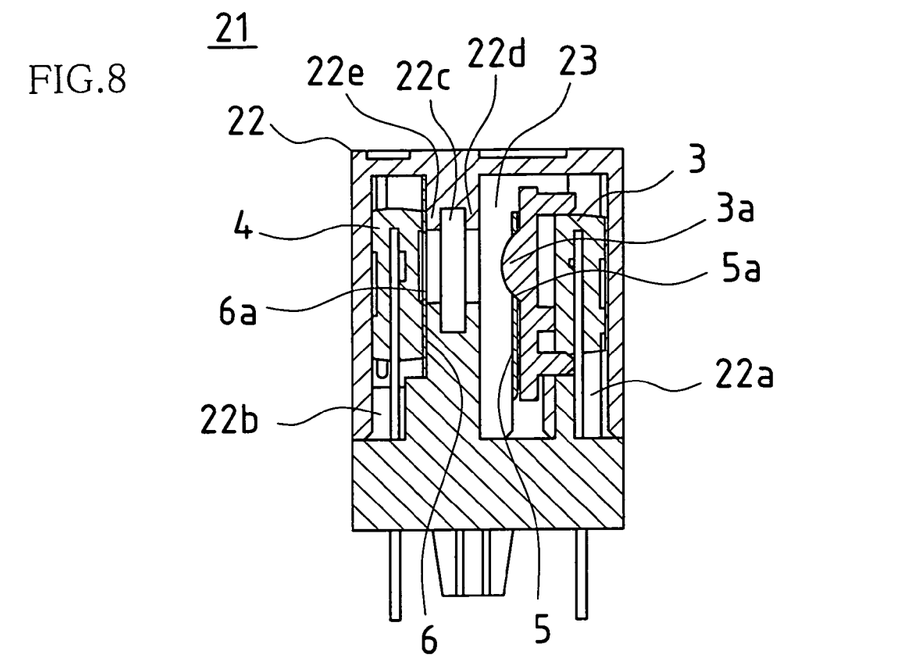
FIG. 8 is a cross section showing a third exemplary embodiment of the photoelectric encoder

FIG. 8 is a cross sectional drawing showing a third exemplary embodiment of the photoelectric encoder of this invention. It should be noted that in the following description and in FIG. 8, structural components that perform the same action as those in the first exemplary embodiment have been assigned the same reference numerals as in FIGS. 1 to 3 in order to avoid repeating a detailed description thereof.

In a photoelectric encoder 21 of this exemplary embodiment, the light-emitting element 3 and the light-receiving element 4 are disposed in opposition to one another in support chambers 22a and 22b on an inner side of a support member 22. A rectangular through hole 22c that passes between the light-emitting element 3 and the light-receiving element 4 is formed in the support member 22. A wall 22d between the support chamber 22a and the through hole 22c is open, and the light-emitting side open window 5a of the slit member 5 overlaps with this open portion. Similarly, a wall 22e between the support chamber 22b and the through hole 22c is open, and the light-receiving side open window 6a of the slit member 6 overlaps with this open portion. The light-emitting element 3 and the light-receiving element 4 are in opposition to each other, sandwiching between them the light-emitting side open window 5a, the through hole 22c, and the light-receiving side open window 6a. The light-emitting element 3 has the lens 3a, and the lens 3a is positioned fitted into the light-emitting side open window 5a.

A large space is secured for the support chamber 22a of the light-emitting element 3, a space 23 of about 0.5 mm to 1.0 mm being provided from the front of the light-emitting element 3 up to the wall 22d.

In the photoelectric encoder 21 with this configuration, like the photoelectric encoder 1 of FIG. 1 and FIG. 2, the code strip 7 is inserted to and moved through the through hole 22c, and the movement position, for example, of the code strip 7 is found from the received-light output of the light-receiving element 4.

Also, by setting a very narrow clearance of 0.1 mm between the code strip 7 and the through hole 22c, the code strip 7 can be moved without hardly wobbling within the through hole 22c. Further, members such as the light-emitting element 3, the lens 3a, and the light-receiving element 4 do not protrude into the through hole 22c. Thus, soils on the code strip 7 are kept from adhering to members such as the light-emitting element 3, the lens 3a, and the light-receiving element 4.

Further, since the space 23 is provided on the front side of the light-emitting element 3, soils on the code strip 7 that may splatter toward the light-emitting element 3 fall downward at the space 23 and collect in the bottom of the space 23. Soils on the code strip 7 are thus kept from adhering to the light-emitting element 3 or the lens 3a.

It should be noted that providing the space 23 in front of the light-emitting element 3 increases the distance separating the light-emitting element 3 and the light-receiving element 4 by about 0.5 mm to 1.0 mm. For this reason, it is necessary to optimize the optical properties between the light-emitting element 3 and the light-receiving element 4 by adopting an aspherical lens as the lens 3a.

It is also possible to provide a space on the light-emitting element 4 side in the same way as with the light-emitting element 3.

Figure 9:
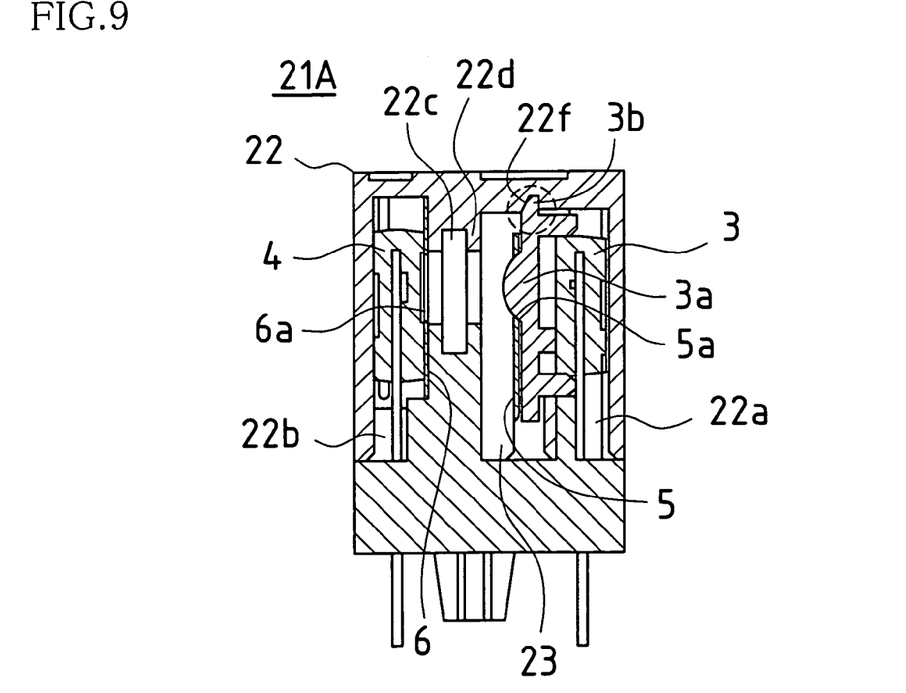
FIG. 9 is a cross section showing a modified example of the photoelectric encoder of FIG. 8.

FIG. 9 is a cross section showing a modified example of the photoelectric encoder 21. In the photoelectric encoder 21A of this modified example, a fitting recession 22f is formed in a ceiling portion of the support chamber 22a of the light-emitting element 3 and a tapered projection 3b is formed in the light-emitting element 3, and the tapered projection 3b of the light-emitting element 3 is fitted into the fitting recession 22f of the support chamber 22a so as to position the light-emitting element 3. Thus, even though there is a space 23 on the front side of the light-emitting element 3 that does not allow the light-emitting element 3 to be abutted against the wall 22d, the light-emitting element 3 can be reliably positioned in either the light-axis direction between the light-emitting element 3 and the light-receiving element 4 or the direction perpendicular to the light-axis direction.

It should be noted that the degree to which the tapered projection 3b of the light-emitting element 3 is tapered can be set within a range of 30° to 60°, for example, and more preferably is set to 45°.

Fourth Exemplary Embodiment

Figure 10:
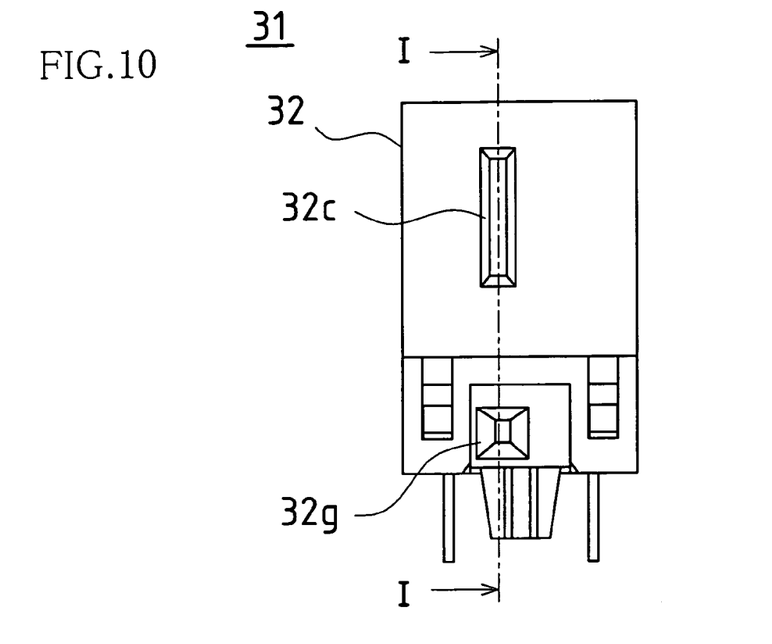
FIG. 10 is a lateral view showing a fourth exemplary embodiment of the photoelectric encoder.
Figure 11:
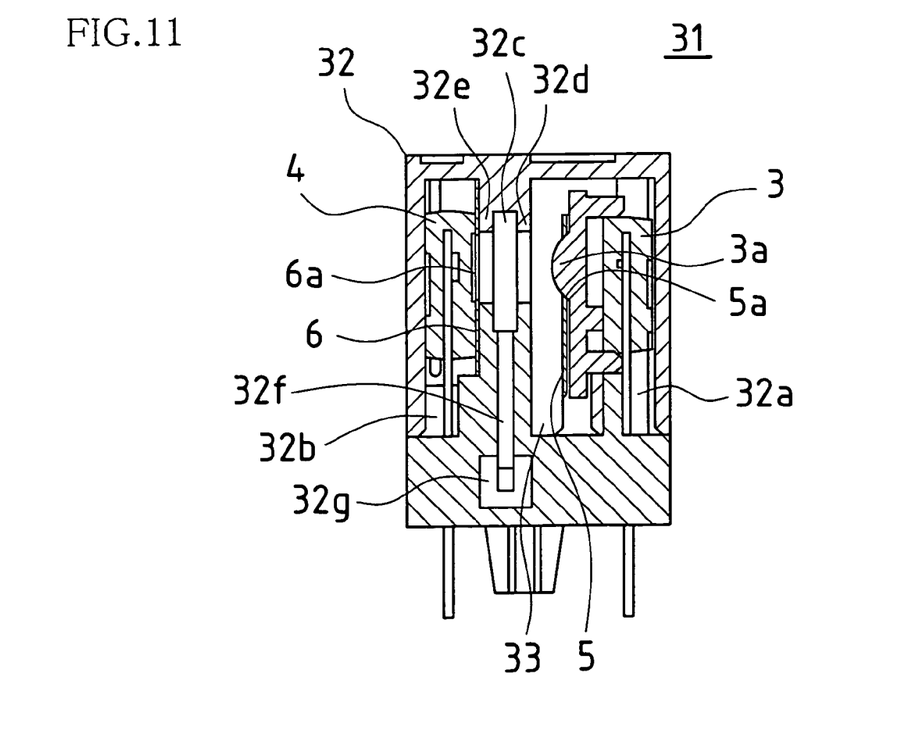
FIG. 11 is a vertical cross section showing the photoelectric encoder of FIG. 10.
Figure 12:
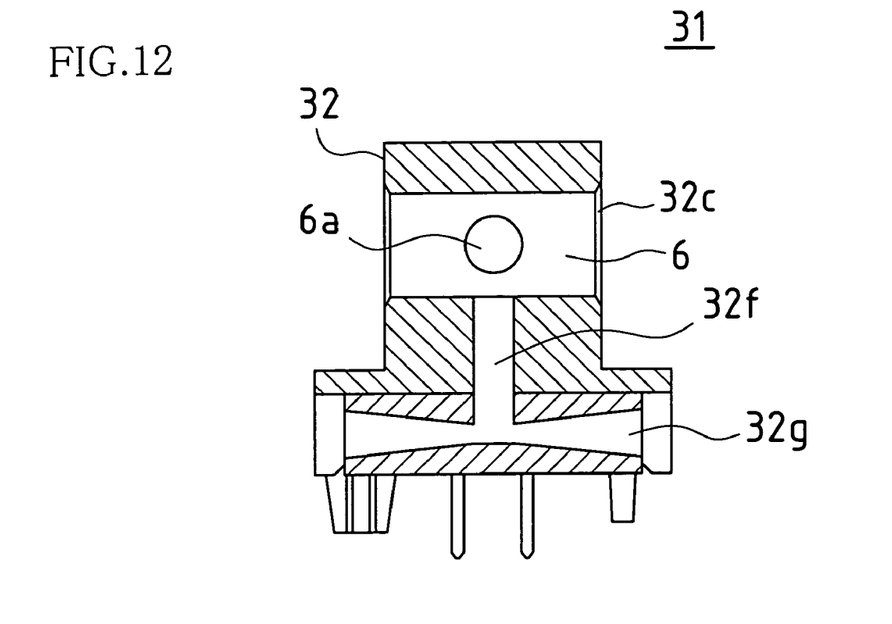
FIG. 12 is a cross section taken along the line I-I in FIG. 10.

FIG. 10 is a side view showing a fourth exemplary embodiment of the photoelectric encoder of the invention. FIG. 11 is a vertical cross section showing the photoelectric encoder of this exemplary embodiment. FIG. 12 is a cross section taken along the line I-I in FIG. 10.

It should be noted that in FIGS. 10 to 12, structural components that perform the same action as those in the first exemplary embodiment have been assigned the same reference numerals as in FIGS. 1 to 3 so as to avoid repeating a detailed description thereof.

In a photoelectric encoder 31 of this exemplary embodiment, the light-emitting element 3 and the light-receiving element 4 are disposed in opposition to one another in two support chambers 32a and 32b, respectively, on an inner side of a support member 32. A rectangular through hole 32c that passes between the light-emitting element 3 and the light-receiving element 4 is formed in the support member 32. A wall 32d between the support chamber 32a and the through hole 32c is open, and the light-emitting side open window 5a of the slit member 5 overlaps with this open portion, and likewise, a wall 32e between the support chamber 32b and the through hole 32c is open, and the light-receiving side open window 6a of the slit member 6 overlaps with this open portion. The light-emitting element 3 and the light-receiving element 4 are in opposition to each other, sandwiching between them the light-emitting side open window 5a, the through hole 32c, and the light-receiving side open window 6a. The light-emitting element 3 has a lens 3a.

The support chamber 32a with the light-emitting element 3 is widened so as to provide a space 33 whose width is about 0.5 mm to 1.0 mm on the front side of the light-emitting element 3.

A discharge hole 32f that extends downward in the drawing is formed substantially in the center of the through hole 32c of the support member 32. The support member 32 has a duct hole 32g that is formed on the drawing lower side of the discharge hole 32f in a direction substantially parallel to the through hole 32c. The discharge hole 32f and the duct hole 32g are connected at substantially the center of the duct hole 32g. The duct hole 32g has a narrowed structure in which it is narrowest at the area where it connects to the discharge hole 32f and gradually widens in both directions from this area of connection up to the openings on either side of the duct hole 32g.

In the photoelectric encoder 31 with this configuration, like the photoelectric encoder 1 of FIG. 1 and FIG. 2, the code strip 7 is inserted into and moved through the through hole 32c, and the movement position, for example, of the code strip 7 is found based on the received-light output of the light-receiving element 4.

Also, by setting a very narrow clearance of 0.1 mm between the code strip 7 and the through hole 32c, the code strip 7 can be moved without hardly wobbling within the through hole 32c. Further, members such as the light-emitting element 3, the lens 3a, and the light-receiving element 4 do not protrude into the through hole 32c. Thus, soils on the code strip 7 are kept from sticking to members such as the light-emitting element 3, the lens 3a, and the light-receiving element 4.

Further, since the space 33 is provided on the front side of the light-emitting element 3, soils on the code strip 7 fall downward at the space 33 and collect in the bottom of the space 33. Soils on the code strip 7 are thus kept from adhering to the light-emitting element 3 or the lens 3a.

The duct hole 32g is connected to the through hole 32c through the discharge hole 32f, and has a narrowed structure in which it is narrowest at the region where it connects to the discharge hole 32f and gradually widens in both directions from this region of connection up to where it opens on both sides. Thus, when the code strip 7 is moved through the through hole 32c, this cause air to flow from the through hole 32c though the discharge hole 32f and into the duct hole 32g, and air also flows from one opening of the duct hole 32g to its other opening through the narrowed structure of the duct hole 32g. Thus, when soils on the code strip 7 are splattered within the through hole 32c, the soils flow from the through hole 32c toward the duct hole 32g by way of the discharge hole 32f and either collect in the duct hole 32g or are discharged from an opening of the duct hole 32g. Thus, soiling on the code strip 7 is kept from adhering to members such as the light-emitting element 3, the lens 3a the light-receiving element 4.

Figure 13:
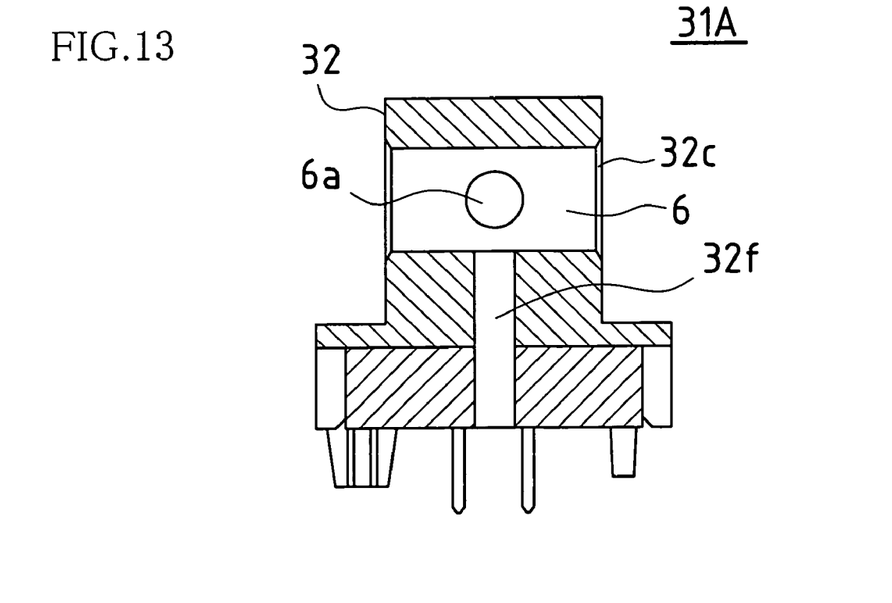
FIG. 13 is a cross section showing a modified example of the photoelectric encoder of FIGS. 10 to 12.

FIG. 13 is a cross section showing a modified example of the photoelectric encoder 31. In the photoelectric encoder 31A of this modified example, the duct hole 32g of the photoelectric encoder 31 of FIGS. 10 to 12 has been omitted, and instead the discharge hole 32f is extended down to the bottom surface of the support member 32. In this case as well, when the code strip 7 is moved in the through hole 32c, this causes air to flow from the through hole 32c to the discharge hole 32f, and when soiling on the code strip 7 splatters in the through hole 32c, those soils are discharged to the outside from the through hole 32c through the discharge hole 32f.

It should be noted that the invention is not limited to the foregoing embodiments, and it can be modified in various ways. For example, it is possible to suitably combine the embodiments and modified examples.

The invention is not limited to photoelectric encoders, and also includes within its scope electric devices that are furnished with a photoelectric encoder of the invention. Examples of such electric devices include printers, copiers, and factory automation.

The invention may be embodied in other forms without departing from the spirit or essential characteristics thereof Thus, the embodiments disclosed in this application are to be considered in all respects as illustrative and not limiting. The scope of the invention is indicated by the scope of the claims rather than by the foregoing description. All modifications and changes that are within the meaning and range of equivalency of the claims fall within the scope of the invention.

What is claimed is:

1. A photoelectric encoder comprising:
a light-emitting element for emitting light and a light-receiving element for receiving light, said light-emitting element light-receiving element disposed in opposition to one another; and
a support member for accommodating the light-emitting element and the light-receiving element, wherein the support member is provided with a through hole or a through groove having a cross-sectional shape configured to receive between said light-emitting and light-receiving elements a code medium having a plurality of slits, and
wherein said through hole or through groove is dimensionally configured to reduce wobbling of the code medium within said through hole or through groove.

2. The photoelectric encoder of claim 1, wherein the support member is provided with a frame member that surrounds an opening in the light-emitting side of the light-emitting element or the light-receiving side of the light-receiving element, and that faces the through hole or the through groove.

3. The photoelectric encoder of claim 2, wherein the frame member comprises a flexible material.

4. The photoelectric encoder of claim 1, wherein an open window through which light may pass is formed in the support member on the light-emitting side of the light-emitting element or the light-receiving side of the light-receiving element.

5. The photoelectric encoder of claim 1, wherein in the support member copmprises a space between the light-emitting side of the light-emitting element and the through hole or the through groove.

6. The photoelectric encoder of claim 5, wherein an inner wall of the support member comprises a fitting recession and the light-emitting member comprises a fitting projection, such that the light-emitting element may be positioned by fitting the fitting projection of the light-emitting element into the fitting recession of said inner wall of the support member.

7. A photoelectric encoder comprising:
a light-emitting element for emitting light and a light-receiving element for receiving light, said light-emitting element and light-receiving element disposed in opposition to one another; and
a support member for accommodating the light-emitting element and the light-receiving element,
wherein the support member is provided with a through hole or a through groove having a cross-sectional shape configured to receiving between said light-emitting and light-receiving elements a code medium having a plurality of slits, and
wherein the support member is furnished with a discharge hole that is connected to the through hole or the through groove and that extends downward from the through hole or the through groove.

8. The photoelectric encoder of claim 7, wherein the discharge hole is connected to a duct hole that extends in the horizontal direction below the discharge hole.

9. An electric device comprising a photoelectric encoder, wherein said photoelectric encoder comprises:
a light-emitting element for emitting light and a light-receiving element for receiving light, said light-emitting element and light-receiving element disposed in opposition to one another; and
a support member for accommodating the light-emitting element and the light-receiving element, wherein the support member is provided with a through hole or a through groove having a cross-sectional shape configured to receive between said light-emitting and light-receiving elements a code medium having a plurality of slits, and wherein said through hole or through groove is dimensionally configured to reduce wobbling of the code medium within said through hole or through groove.

10. A photoelectric encoder comprising a light-emitting element for emitting light and a light-receiving element for receiving light, said light-emitting element and light-receiving element disposed in opposition to one another, and a support member for accommodating the light-emitting element and the light-receiving element, wherein the support member is provided with a through hole or a through groove configured to receive between said light-emitting and light-receiving elements a code medium having a plurality of slits; and wherein said support member is provided with a frame member for contacting a surface of the code medium.

11. The photoelectric encoder of claim 10, wherein the frame member comprises a flexible material.

12. The photoelectric encoder or claim 1, wherein said support member comprises a conductive resin.

13. The photoelectric encoder of claim 1,
wherein the support member is configured to provide a first clearance between the through hole and the code medium;
wherein the support member is configured to provide a second clearance between the through hole and the code medium; and
wherein the first clearance is equal to the second clearance.

14. The photoelectric encoder of claim 1, wherein the support member is configured to provide a clearance of 0.1 mm between the code medium and the through hole or through groove.

15. The photoelectric encoder of claim 13, wherein each of said first and second clearances is 0.1 mm.

16. The photoelectric encoder of claim 2, wherein the frame member is configured to contact a surface of the code medium.

17. The photoelectric encoder of claim 10, wherein the frame member is configured to wipe soil from the code medium.

18. The photoelectric encoder of claim 16, wherein the frame member is configured to wipe soil from the code medium.

19. The photoelectric encoder of claim 1, wherein said through hole or through groove is dimensionally configured such that there is substantially no wobbling of the code medium within said through hole or through groove.

* * * * *